United States Patent
Sahashi et al.

(10) Patent No.: US 7,024,073 B2
(45) Date of Patent: Apr. 4, 2006

(54) REFLECTIVE VARIABLE LIGHT ATTENUATOR

(75) Inventors: Teruhisa Sahashi, Shizuoka (JP); Hidenori Nakada, Aichi (JP); Shohei Abe, Shizuoka (JP); Isao Kojima, Aichi (JP); Keisuke Ikeda, Shizuoka (JP)

(73) Assignee: FDK Corporation, Tokyo (JP)

( * ) Notice: Subject to any disclaimer, the term of this patent is extended or adjusted under 35 U.S.C. 154(b) by 0 days.

(21) Appl. No.: 10/490,689

(22) PCT Filed: Sep. 20, 2002

(86) PCT No.: PCT/JP02/09705
§ 371 (c)(1),
(2), (4) Date: Jun. 23, 2004

(87) PCT Pub. No.: WO03/032055
PCT Pub. Date: Apr. 17, 2003

(65) Prior Publication Data
US 2004/0234227 A1    Nov. 25, 2004

(30) Foreign Application Priority Data
Sep. 26, 2001  (JP) .............................. 2001-293122

(51) Int. Cl.
G02B 6/26  (2006.01)
G02B 6/42  (2006.01)
G02B 6/32  (2006.01)
G02F 1/09  (2006.01)
G02F 1/00  (2006.01)

(52) U.S. Cl. ........................ 385/31; 385/33; 385/47; 359/282; 359/283; 359/324; 359/484

(58) Field of Classification Search .............. 385/11, 385/31, 33, 36, 47, 140; 359/494, 497, 282, 359/283, 324, 484
See application file for complete search history.

(56) References Cited

U.S. PATENT DOCUMENTS

| | | | |
|---|---|---|---|
| 6,018,411 A | 1/2000 | Fukushima et al. | |
| 6,560,379 B1 * | 5/2003 | Ikeda et al. | 385/11 |
| 6,631,238 B1 * | 10/2003 | Liu et al. | 385/140 |

FOREIGN PATENT DOCUMENTS

| | | | |
|---|---|---|---|
| JP | 04-221922 A | | 12/1992 |
| JP | 06-160774 A | | 6/1994 |
| JP | 11-002781 A | | 1/1999 |
| JP | 2000-249997 | * | 9/2000 |
| JP | 2000-249997 A | | 9/2000 |

OTHER PUBLICATIONS

International Search Report for PCT/JP02/09705 mailed Oct. 29, 2002; ISA/JPO.

* cited by examiner

*Primary Examiner*—Frank G. Font
*Assistant Examiner*—Charlie Peng
(74) *Attorney, Agent, or Firm*—Harness, Dickey & Pierce, P.L.C.

(57) ABSTRACT

A reflection-type variable optical attenuator comprises: a main attenuator unit including a first birefringent crystal plate, a Faraday rotational angle varying unit, and a second birefringent crystal plate arranged in this order; an input port and an output port that are arranged on a side of one end of the main attenuator unit; and a two-point reflection-type optical path varying reflector that is arranged on a side of the other end of the main attenuator unit. Light that comes in from the input port makes a round trip in the main attenuator unit and goes out through the output port.

14 Claims, 6 Drawing Sheets

REFLECTIVE VARIABLE LIGHT ATTENUATOR

TECHNICAL FIELD

The present invention relates to a reflection-type variable optical attenuator that is configured by combining a main attenuator unit and an optical path varying reflector such that the light makes a round trip through the main attenuator unit. The optical attenuator is particularly useful when a shutter function to attenuate incoming light at a high rate is required.

BACKGROUND ART

Dense wavelength division multiplexing systems (DWDM), for example, used in the optical communication field require optical attenuation and an optical shutter function for the adjustment of the level of signal light amplified by erbium-doped fiber amplifiers (EDFA). A variable optical attenuator is used for such purposes.

Various types of variable optical attenuators have been developed. An opposed-type attenuator is one typical example, and this includes a polarizer and an analyzer, which are wedge-shaped birefringent plates, arranged at both sides (the input side and the output side) of a Faraday rotational angle varying unit on its optical axis. The Faraday rotational angle varying unit that is incorporated generally applies external magnetic fields from at least two directions to a Faraday element (for example, a magnetic garnet single crystal film having Faraday effect) and changes a composite magnetic field obtained therefrom to control the Faraday rotational angle of the light beam passing through the Faraday element.

Incident light from an input fiber is collimated into collimated light by a lens, passes through the polarizer, the Faraday element of the Faraday rotational angle varying unit, and the analyzer in this order, is condensed by a lens, and is then introduced into an output fiber. A permanent magnet applies a stationary magnetic field to the Faraday element in the direction parallel to the optical axis, and an electromagnet applies a variable magnetic field that is perpendicular to the optical axis. When the direction of magnetization of the Faraday element is changed by changing the composite magnetic field, the Faraday rotational angle changes, and thereby the amount of light passing through the analyzer can be controlled.

Such a variable optical attenuator, which employs the wedge-shaped birefringent plates as the polarizer and the analyzer, is of the polarization non-dependence type, and therefore, it is particularly suitable for a fiber coupling type device. In order to achieve a high-attenuation shutter function with this structure, it would only be necessary to connect the variable optical attenuators of the above-mentioned type in a two-stage cascade. With such a configuration, however, the number of components becomes large, and a problem involving increase in size arises.

In recent years, a reflection-type structure has been proposed for a variable optical attenuator (refer to, for example, JP-A 10-161076). This attenuator includes a two-core ferrule provided with an input fiber and an output fiber, a lens, a wedge-shaped birefringent plate, a magnetooptical crystal (Faraday element), and a reflecting mirror, and is configured such that a magnetic field is applied to the magnetooptical crystal to change the Faraday rotational angle. This reflection-type variable optical attenuator can be formed in a small size and can be made to be polarization non-dependent by using the wedge-shaped birefringent plate.

In this reflection-type variable optical attenuator with such a structure, however, there exists an angle, with respect to the reflecting mirror, between the input light and the output light (the reflected light) which is dependent on the focal distance of the lens, and thus, the pitch between the input and the output fibers of the two-core ferrule is predetermined. Therefore, there are design limitations to the distance between the end of the ferrule and the reflecting mirror. Further, since the light from the wedge-shaped birefringent plate is emitted at an angle, the light has to be incident obliquely on the plate. Therefore, the reflection-type attenuator is sensitive to incident angle and is difficult to manufacture. Furthermore, the reflection-type attenuator has a problem that it is incapable of achieving a high-attenuation shutter function.

It is an object of the present invention to provide a variable optical attenuator that is capable of achieving a high-attenuation shutter function and that is easy to manufacture. Another object of the present invention is to provide a variable optical attenuator that can be made smaller compared to a conventional two-stage cascade connection type attenuator and that can achieve power saving and reduction in the number of components while being provided with a high-attenuation shutter function. A further object of the present invention is to provide a variable optical attenuator having a structure that allows to halve the space necessary for mounting the input and output fibers, that allows installation even in corners, and that has an increased degree of freedom of selecting a position for installation while being provided with a high-attenuation shutter function. A further object of the present invention is to provide a reflection-type variable optical attenuator in which it is possible to reduce wavelength-dependent losses and also reduce temperature-dependent losses.

DISCLOSURE OF INVENTION

One aspect of the present invention provides a reflection-type variable optical attenuator comprising: a main attenuator unit including a first birefringent crystal plate, a Faraday rotational angle varying unit, and a second birefringent crystal plate arranged in this order; an input port and an output port that are arranged on a side of one end of the main attenuator unit; and a two-point reflection-type optical path varying reflector that is arranged on a side of the other end of the main attenuator unit; wherein light that comes in from the input port makes a round trip in the main attenuator unit and goes out through the output port.

Here, it is possible to arrange a quarter-wavelength plate between the main attenuator unit and the optical path varying reflector such that a light beam for a forward path and a light beam for a return path both pass through the quarter-wavelength plate. Instead of the above-mentioned quarter-wavelength plate, it is also possible to arrange a half-wavelength plate between the main attenuator unit and the optical path varying reflector such that either one of a light beam for a forward path or a light beam for a return path passes through the half-wavelength plate.

The two-point reflection-type optical path varying reflector may have a right-angle prism or a corner-cube prism, or may have a structure in which two reflecting mirrors are combined at right angles.

As for fiber-coupling devices, an input fiber and an output fiber of a two-core ferrule are arranged at the positions of the input port and the output port, respectively; and a fiber coupling lens that is shared for input and output, and an optical path correcting element that collimates the light emitted from the input fiber into a beam that is parallel to the optical axis and that couples, to the output fiber, a beam that is the return light and that is parallel to the optical axis are arranged between the first birefringent crystal plate and the two-core ferrule. The two-core ferrule may have a structure in which the input fiber and the output fiber are both eccentric with respect to the center axis of the ferrule, or may have a structure in which either one of the input fiber or the output fiber is positioned on the center axis of the ferrule, and the other one is eccentric with respect to the center axis.

The Faraday rotational angle varying unit has a Faraday element, a permanent magnet that magnetically saturates the Faraday element, and an electromagnet that applies a variable magnetic field to the Faraday element. Here, the Faraday element may include a combination of a basic film Faraday element in which a Faraday rotational angle changes in a range of 90° or above according to a magnetic field applied by the electromagnet, and a compensating film Faraday element that has a high coercive force and in which a Faraday rotational angle scarcely changes with respect to the magnetic field applied by the electromagnet. The stationary magnetic field generated by the permanent magnet is applied in a direction parallel to the optical axis, and the variable magnetic field generated by the electromagnet is applied in a direction perpendicular to the optical axis. Further, for example, it is possible to form the Faraday element to have a structure in which a compensating film Faraday element that has a high coercive force and in which a Faraday rotational angle scarcely changes with respect to a magnetic field caused by the electromagnet is arranged between two same basic film Faraday elements that have been divided into two and in which Faraday rotational angles change according to the magnetic field applied by the electromagnet. In these structures, the basic film Faraday element and the compensating film Faraday element are made of a combination of materials in which the Faraday rotational angles are in opposite directions. Even when basic film Faraday elements that have been divided into two are used, the range within which both Faraday rotational angles can vary is set to be 900 or above in total. It is preferable that the basic film Faraday element and the compensating film Faraday element are made of a combination of materials in which wavelength-dependent losses and/or temperature-dependent losses cancel each other. It should be noted that when the first birefringent crystal plate and the second birefringent crystal plate have a wedge shape, the angle between the optic axes of the plates is set to 90°. When the first birefringent crystal plate and the second birefringent crystal plate are parallel flat plates, the angles of the optic axes of the plates are set to be parallel to each other.

In an example of a practical embodiment, the electromagnet is formed of a C-shaped magnetic yoke and a coil wound around the yoke; and the electromagnet is placed in a plane that is parallel to the optical axis such that the C-shaped magnetic yoke surrounds the optical path varying reflector. In this way, it is possible to achieve a variable optical attenuator with a flat structure, and in cooperation with the fact that the attenuator is of the reflection type, the attenuator can be mounted on a device while requiring minimum space.

Further, wavelength-dependent losses and/or temperature-dependent losses in the main attenuator unit can be reduced by inserting, in at least one position between optical parts of the attenuator, an optical filter in which an optical filter film is formed on a transparent substrate. Instead of providing an optical filter, an optical filter function may be imparted on at least one optical surface of an optical part of the attenuator.

BEST MODE FOR CARRYING OUT THE INVENTION

A preferred embodiment of the present invention is described in detail below with reference to the appended drawings.

Figure 1A:
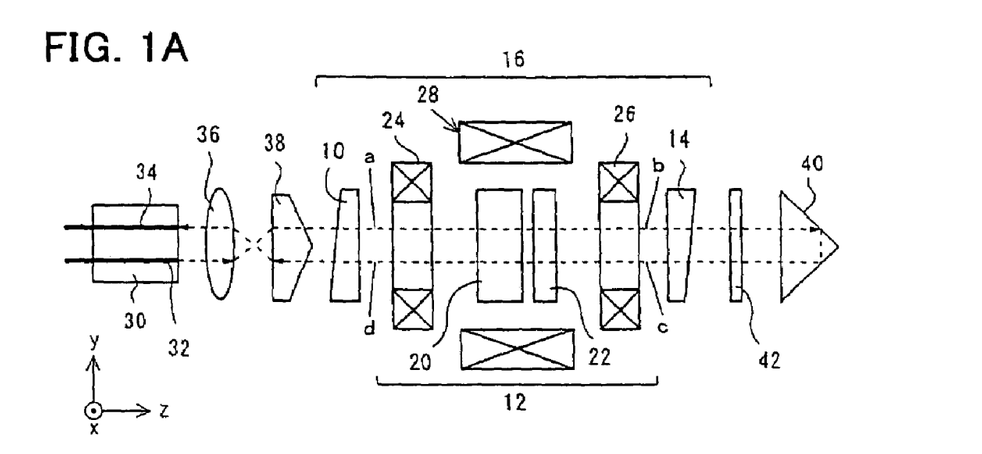
FIG. 1 is an explanatory diagram showing an example of a reflection-type variable optical attenuator according to the present invention.
Figure 1B:
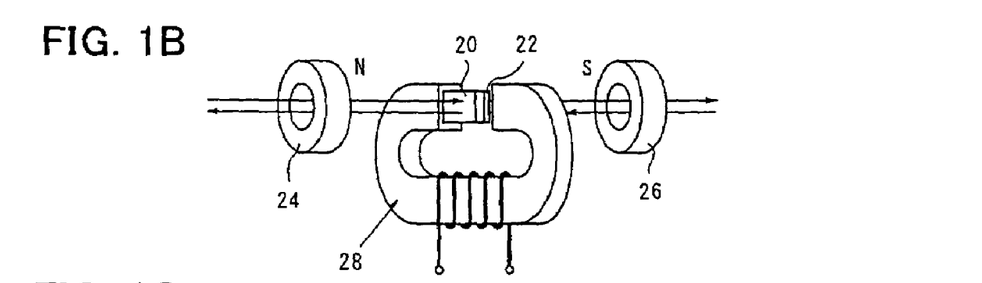
Figure 1C:
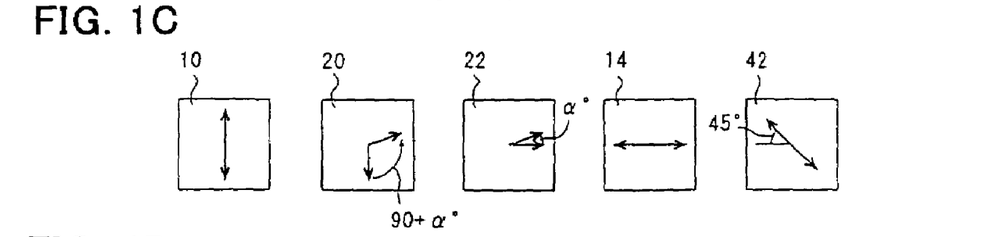
Figure 1D:
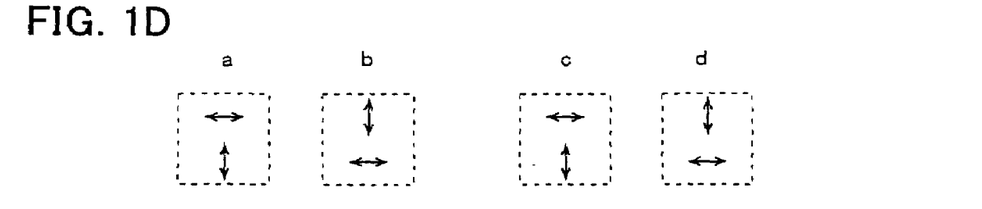

FIG. 1A to FIG. 1D show an example of a reflection-type variable optical attenuator according to the present invention. FIG. 1A shows a state in which the parts are arranged and an optical path, FIG. 1B shows an example of a specific construction of a Faraday rotational angle varying unit, FIG. 1C shows the directions of the optic axis or the directions of Faraday rotation of each of the optical parts, and FIG. 1D shows the polarization separation state of the forward-path light and the return-path light at positions a, b, c, and d at the front and the rear of the Faraday rotational angle varying unit. It should be noted that an actual optical path is not in a straight line because it is slightly refracted and varied due to, for example, the inclination of the input and output surfaces of the optical parts, the direction of the light beam, and the relationship between the polarization plane and the optic axis. In FIG. 1A, only the light path used as the optical attenuator is shown schematically by broken lines. Coordinate axes as follows are set in order to facilitate understanding. The direction in which the optical parts are arranged in the forward path is the z-direction (the direction from the left toward the right in the figure) and the two directions perpendicular to the z-direction are the x-direction (the direction perpendicular to the paper face in the figure) and the y-direction (the up/down direction in the figure). Further, as regards the rotation direction, the counterclockwise direction, when looking in the z-direction, is regarded as the positive side.

A main attenuator unit 16 is configured by arranging a first birefringent crystal plate 10, a Faraday rotational angle varying unit 12, and a second birefringent crystal plate 14 in this order. The first birefringent crystal plate 10 and the second birefringent crystal plate 14 are wedge shaped and are made, for example, of rutile crystal. The Faraday rotational angle varying unit 12 includes a basic film Faraday element 20, a compensating film Faraday element 22, a pair of permanent magnets 24 and 26 for magnetically saturating the Faraday elements 20 and 22, and a C-shaped electromagnet 28 for applying a variable magnetic field to the Faraday elements 20 and 22. Stationary magnetic fields created by the annular permanent magnets 20 and 22 that are magnetized in the direction of thickness are applied in the direction of the optical axis. A variable magnetic field created by the electromagnet 28 is applied in a direction perpendicular to the optical axis. The basic film Faraday element 20 is a Faraday element whose Faraday rotational angle changes according to the magnetic field of the electromagnet. The compensating film Faraday element 22 is a Faraday element that has a high coercive force and whose Faraday rotational angle scarcely changes with respect to the magnetic field of the electromagnet.

The basic film Faraday element 20 and the compensating film Faraday element 22 are formed as a combination of materials in which the directions of Faraday rotation are opposite from each other. The basic film Faraday element 20 is set so that the range within which the Faraday rotational angle can be varied is 90° or above. It is preferable to select, as the basic film Faraday element 20 and the compensating film Faraday element 22, magnetooptical crystals that have characteristics in which wavelength-dependent losses and/or temperature-dependent losses cancel each other. An LPE (liquid-phase epitaxy grown) Bi-substituted rare-earth iron garnet film is a typical example of the magnetooptical crystal. The basic film Faraday element 20 is formed to have a thickness such that the Faraday rotational angle can be varied within a range of $(90+\alpha)°$ or above. The compensating film Faraday element 22 is formed to have a thickness such that the Faraday rotational angle is $-\alpha°$ (refer to FIG. 1C). The first birefringent crystal plate 10 and the second birefringent crystal plate 14 are set such that their optic axes form an angle of 90°. As shown in FIG. 1C, the optic axis of the first birefringent crystal plate 10 is set parallel to the y-axis, and the optic axis of the second birefringent crystal plate 14 is set parallel to the x-axis.

An input port and an output port are positioned on the side of one end of the main attenuator unit 16. The input fiber 32 and the output fiber 34 of a two-core ferrule 30 are arranged at the positions of the input port and the output port. A fiber coupling lens (convex lens) 36, which is shared for input and output, and an optical path correcting element (pentaprism) 38 are arranged between the first birefringent crystal plate 10 and the two-core ferrule 30. The optical path correcting element 38 collimates the light emitted from the input fiber 32 into a beam that is parallel to the optical axis, and couples, to the output fiber 34, a beam that is the return light and that is parallel to the optical axis. The two-core ferrule 30 has a structure in which the input fiber 32 and the output fiber 34 are symmetrically eccentric with respect to the center axis of the ferrule.

A two-point reflection-type optical path varying reflector 40 is arranged on the side of the other end of the main attenuator unit 16. The optical path varying reflector 40 is, for example, a right-angle prism. With this structure, the light makes a round trip in the main attenuator unit 16. A quarter-wavelength plate 42 is interposed between the main attenuator unit 16 and the optical path varying reflector 40 such that both the forward-path light beam and the return-path light beam pass through the quarter-wavelength plate. The optic axis of the quarter-wavelength plate 42 is inclined at an angle of 45° with respect to the x-direction.

Next, the operation of the reflection-type variable optical attenuator will be described. The light that has been emitted from the input fiber 32 is condensed by the fiber coupling lens 36 and is collimated into a beam parallel to the optical axis by the optical path correcting element 38. The first birefringent crystal plate (serving as a polarizer for the forward path) 10 separates the light into an ordinary light and an extraordinary light. Their polarization directions are perpendicular to each other. The polarization directions of the ordinary and extraordinary light are rotated according to the intensity of magnetization in the direction perpendicular to the optical axis when the ordinary and extraordinary light passes through the Faraday rotational angle varying unit 16. The second birefringent crystal plate (serving as an analyzer for the forward path) 14 separates each ordinary and extraordinary light into ordinary light and extraordinary light. Only the ordinary and extraordinary light components that are parallel to the optical axis are reflected at two points by the optical path varying reflector 40 and return as the return-path light that is parallel to the forward-path light. Ordinary and extraordinary light components that are not parallel to the optical axis do not become the return-path light, which is parallel to the optical axis, even if they are reflected by the optical path varying reflector 40. The amount of light returned is dependent on the Faraday rotational angle of the Faraday rotational angle varying unit 16. During the forward path before reflection takes place, linear polarized light is converted into circularly polarized light when it passes through the quarter-wavelength plate 42. During the return path after reflection has taken place, the circularly polarized light is changed back into linear polarized light by the quarter-wavelength plate 42. In this way, the ordinary light and the extraordinary light are exchanged in the main attenuator unit 16 during the forward path and the return path and thereby polarization dispersion is cancelled.

The second birefringent crystal plate (serving as a polarizer for the return path) 14 separates the return-path light into ordinary light and extraordinary light. Their polarization directions are perpendicular to each other. The polarization directions of the ordinary and extraordinary light are rotated according to the intensity of magnetization in a direction that is perpendicular to the optical axis when the ordinary and extraordinary light passes through the Faraday rotational angle varying unit 16. The first birefringent crystal plate (serving as an analyzer for the return path) 10 separates each ordinary and extraordinary light into ordinary light and extraordinary light. Only the ordinary and extraordinary light components that are parallel to the optical axis are coupled with the output fiber 34 by the lens 36 after passing through the optical path correcting element 38. The amount of light coupled is also dependent on the Faraday rotational angle of the Faraday rotational angle varying unit 16. It should be noted that, among the light emitted from the first birefringent crystal plate 10, ordinary and extraordinary light components that are not parallel to the optical axis are not coupled with the output fiber 34.

In general, high attenuation cannot be achieved with variable optical attenuators because, when the angle between the polarizer and the analyzer is 90°, the polarization direction cannot be rotated up to the non-transmissive axis of the analyzer and a cross-Nicol state cannot be-realized. In the present example, however, the polarization direction can be rotated up to the non-transmissive axis of the analyzer (the second birefringent crystal plate 14) by using, in combination, the basic film Faraday element 20 that is made variable according to the intensity of the external magnetic field and the compensating film Faraday element 22 that is not affected by the external magnetic field and whose rotation direction is opposite to that of the element 20. With this structure, high attenuation can be achieved even though the angle between the optic axis of each of the polarizer and the analyzer (the angle between the optic axes of the first birefringent crystal plate 10 and the second birefringent crystal plate 14) is 90°. Furthermore, since the light makes a round trip through the main attenuator unit 16, the attenuation function is approximately doubled. Thus, it is possible to achieve high attenuation and a shutter function with a maximum attenuation amount of 50 dB or above.

Figure 2:
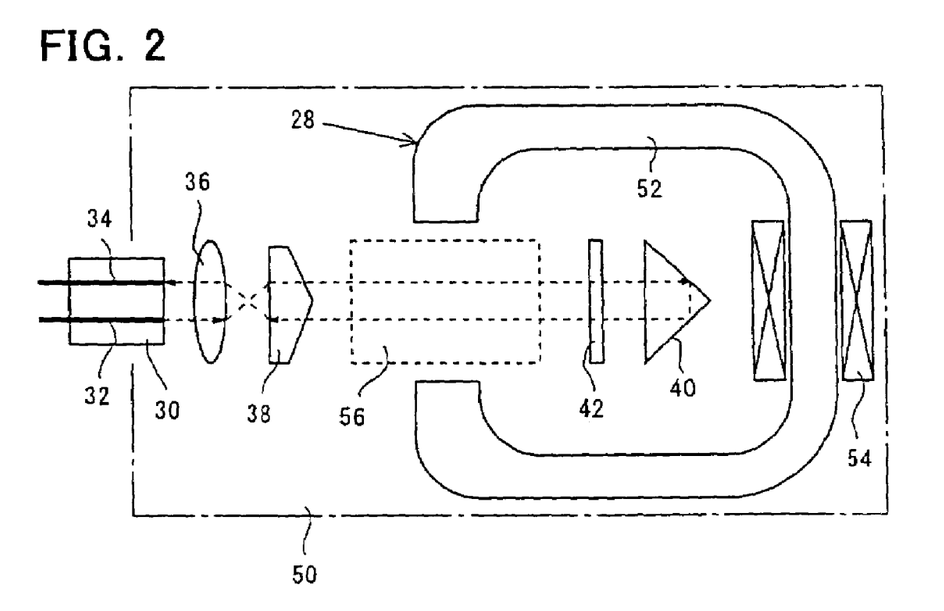
FIG. 2 is an explanatory diagram showing an example of how the attenuator is mounted.

FIG. 2 is an explanatory diagram showing an example of how the attenuator is practically mounted. Necessary optical parts are mounted on a substrate 50. Since the present invention is of the reflection-type and not of the opposed-type, nothing is arranged behind the optical path varying reflector 40. Therefore, this space can be used for placing the electromagnet 28. More specifically, the electromagnet 28 is formed of a C-shaped magnetic yoke 52 and a coil 54 wound around it, and is placed in a plane (the xz plane) that is parallel to the optical axis so that the C-shaped magnetic yoke 52 surrounds the optical path varying reflector 40. Thus, it is possible to provide a variable optical attenuator with a flat structure, and in cooperation with the fact that the attenuator is of the reflection type, the attenuator can be mounted on a device (in particular, in corners etc.) while requiring minimum space. It should be noted that the block indicated by reference number 56 stands for the main attenuator unit without the electromagnet.

In FIG. 1, the order of arrangement of the basic film Faraday element 20 and the compensating film Faraday element 22 may be reversed. The permanent magnets 24 and 26 may be arranged on the outer side, although they are arranged on the inner side of the birefringent crystal plates 10 and 14.

Figure 3:
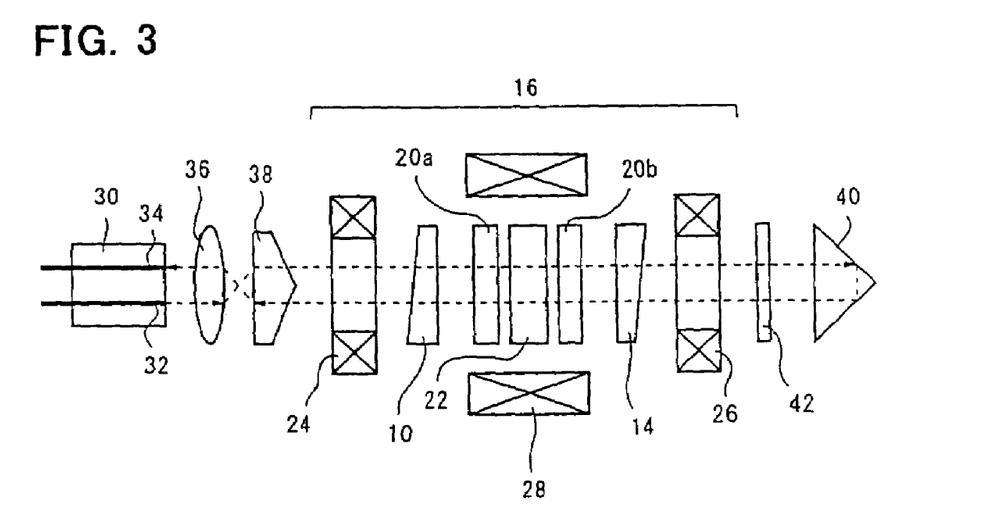
FIG. 3 is an explanatory diagram showing another example of a reflection-type variable optical attenuator according to the present invention.

FIG. 3 is an explanatory diagram showing another example of a reflection-type variable optical attenuator according to the present invention. The basic configuration thereof is the same as that of the example in FIG. 1, and hence, same reference characters are assigned to the corresponding members, and description thereof will be omitted. What are different from FIG. 1 are the Faraday elements, their state of arrangement, and the positions of the permanent magnets. It should be noted that the positions of the permanent magnets 24 and 26 may be on the inner side of the birefringent crystal plates 10 and 14, as in the above-mentioned example. Here, a compensating film Faraday element 22, which has a high coercive force and whose Faraday rotational angle scarcely changes with respect to the magnetic field of the electromagnet, is arranged between two basic film Faraday elements 20a and 20b that are made of the same element divided into two and whose Faraday rotational angles change according to the magnetic field of the electromagnet. The basic film Faraday elements 20a and 20b and the compensating film Faraday element 22 are formed as a combination of materials that cause Faraday rotation in opposite directions. The basic film Faraday elements 20a and 20b, which have been divided into two, are set so that the range within which the Faraday rotational angle can be varied is 90° or above in total. In the present invention, the light makes a round trip through the main attenuator unit 16. By configuring the attenuator as in the present example, the order of transmission and the state of transmission of the light with respect to the Faraday elements become the same during the forward path and the return path, and thus, it is possible to obtain a further satisfactory high-attenuation characteristic.

Figure 4:
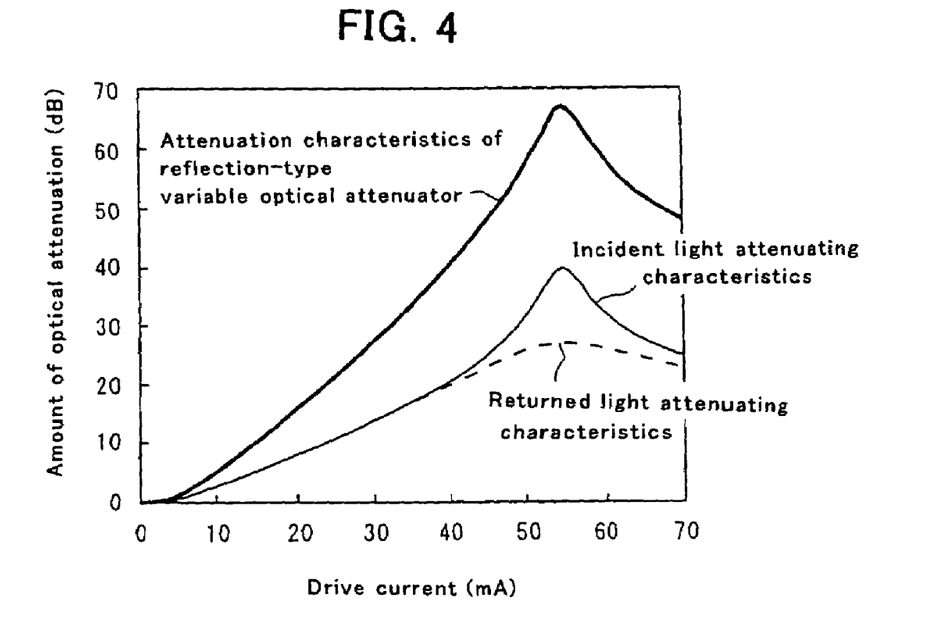
FIG. 4 is a graph showing an example of optical attenuation characteristics of the reflection-type variable optical attenuator shown in FIG. 1.
Figure 5:
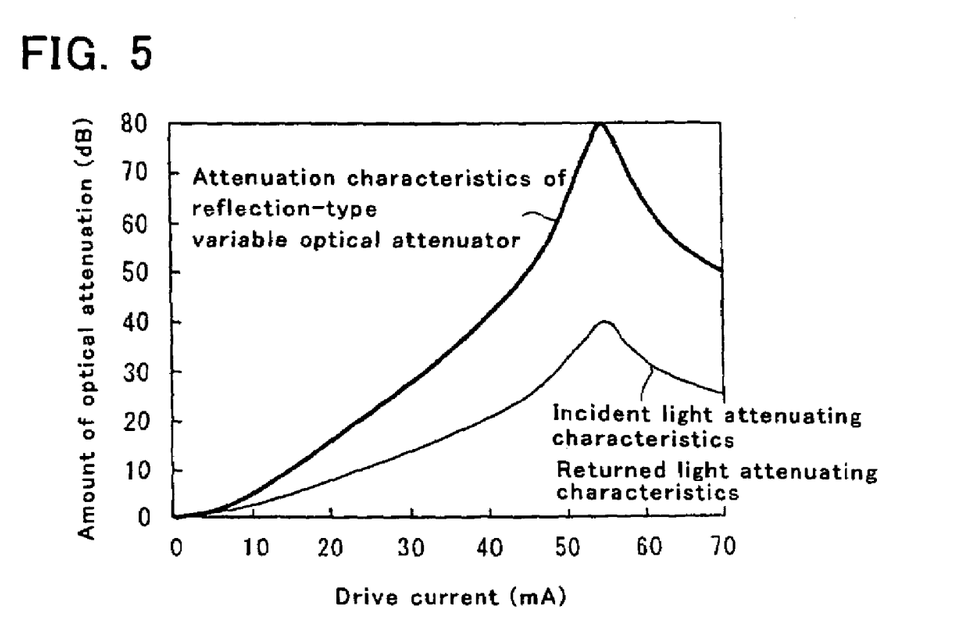
FIG. 5 is a graph showing an example of optical attenuation characteristics of the reflection-type variable optical attenuator shown in FIG. 3.

FIG. 4 and FIG. 5 show examples of optical attenuation characteristics of the reflection-type variable optical attenuators according to the present invention. FIG. 4 is an example of measured results for the configuration shown in FIG. 1. Suppose that, when the magnetic field of the electromagnet is zero, the Faraday rotational angle of the basic film Faraday element is 96°, the Faraday rotational angle of the compensating film Faraday element is −15°, and the angle between the optic axes of the first birefringent crystal plate and the second birefringent crystal plate is 90°. In this case, the cross-Nicol state is obtained when the Faraday rotational angle of the basic film Faraday element is 15° and an attenuation amount of 35 dB or above (an incident light attenuation amount) can be achieved. At this time, although it is possible to achieve attenuation characteristics (a return light attenuation amount) because the angle between the optic axes of the first birefringent crystal plate and the second birefringent crystal plate is 90° also for the incident light from the opposite direction (reflected light), the attenuation characteristics would be deteriorated because the polarization plane would be first rotated by the compensating film Faraday element. However, since the optical attenuation characteristics of the reflection-type variable optical attenuator of the present invention are achieved through the addition of the characteristics of the forward path and the characteristics of the return path, it becomes possible to achieve a high-attenuation shutter function of 60 dB or above. It should be noted that the wavelength for measurement is 1545 nm.

FIG. 5 is an example of measured results for the configuration shown in FIG. 3. Suppose that, when the magnetic field of the electromagnet is zero, the Faraday rotational angle of each basic film Faraday element is 48°, the Faraday rotational angle of the compensating film Faraday element is −15°, and the angle between the optic axes of the first birefringent crystal plate and the second birefringent crystal plate is 90°. In this case, the cross-Nicol state is obtained when the Faraday rotational angle of both basic film Faraday elements is 7.5°, respectively, and an attenuation amount of approximately 40 dB (an incident light attenuation amount) can be achieved. At this time, it is possible to achieve exactly the same attenuation characteristics (a return light attenuation amount) for the return path as the forward path because the angle between the optic axes of the first birefringent crystal plate and the second birefringent crystal plate is 90° also for the incident light from the opposite direction (the reflected light) and the state in which the Faraday elements are arranged is symmetrical. Further, since the optical attenuation characteristics of the reflection-type variable optical attenuator of the present invention are achieved through the addition of the characteristics of the forward path and the characteristics of the return path, it is possible to achieve an extremely superior high-attenuation shutter function of approximately 80 dB. It should be noted that the wavelength for measurement is also 1545 nm.

Figure 6:
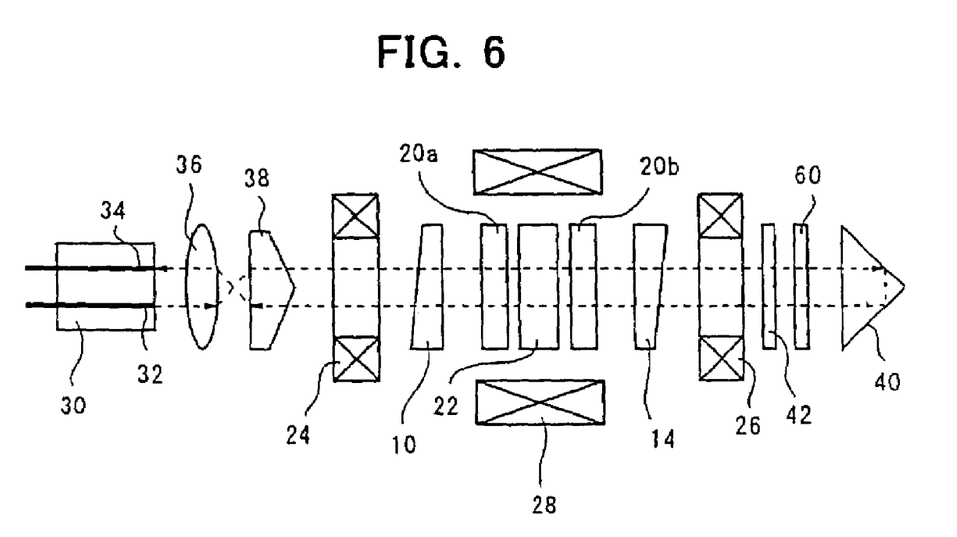
FIG. 6 is an explanatory diagram showing a further example of a reflection-type variable optical attenuator according to the present invention.

FIG. 6 is an explanatory diagram showing a further example of a reflection-type variable optical attenuator according to the present invention. The basic configuration thereof is the same as that of the example in FIG. 3, and hence, same reference characters are assigned to the corresponding members, and description thereof will be omitted. What is different from FIG. 3 is that an optical filter 60 has been inserted. The optical filter 60 is formed to be an optical filter film, with desired characteristics, that is made of a multilayer dielectric film on a glass substrate.

The wavelength-dependent loss inclination of the optical filter is determined taking into consideration the maximum and minimum wavelength-dependent loss inclinations for when the attenuator is not provided with an optical filter. Basically, the wavelength-dependent loss inclination is between the maximum and minimum wavelength-dependent losses for when no optical filter is employed and its inclination is reverse to the maximum and minimum inclinations. In this way, the wavelength dependence of the optical attenuator can be lessened by providing an optical filter having characteristics that are reversed to the wavelength-dependent losses of the optical attenuator caused by the wavelength characteristics of the Faraday rotational angle of the Faraday elements.

For example, suppose that the maximum wavelength-dependent loss inclination of a reflection-type variable optical attenuator without an optical filter is WDL1, the minimum wavelength-dependent loss inclination thereof is WDL2, and the wavelength-dependent loss inclination of the optical filter 60 is X. It is preferable to set the attenuator so as to meet the following condition:

$$X \approx -(WDL1-WDL2)/4$$

if the attenuator is structured such that both the forward-path light beam and the return-path light beam pass through the optical filter, and it is preferable to set the attenuator so as to meet the following condition:

$$X \approx -(WDL1-WDL2)/2$$

if the attenuator is structured such that only either one of the forward-path light beam or the return-path light beam passes through the optical filter. Further, in cases where it is only necessary to be able to sufficiently reduce the wavelength-dependent losses only within an arbitrary usage attenuation range, and supposing that the maximum wavelength-dependent loss inclination within the arbitrary usage attenuation range of a reflection-type variable optical attenuator without an optical filter is WDL3, the minimum wavelength-dependent loss inclination thereof is WDL4, and the wavelength-dependent loss inclination of the optical filter 60 is X, then the attenuator is set so as to meet the following condition:

$$X \approx -(WDL3-WDL4)/4$$

if the attenuator is structured such that both the forward-path light beam and the return-path light beam pass through the optical filter, and the attenuator is set so as to meet the following condition:

$$X \approx -(WDL3-WDL4)/2$$

if the attenuator is structured such that only either one of the forward-path light beam or the return-path light beam passes through the filter.

Although the optical filter 60 is arranged between a quarter-wavelength plate 42 and an optical path varying reflector 40 in the example shown in FIG. 6, it may be arranged between other optical parts. It is of course possible to dispersedly arrange a plurality of optical filters at a plurality of different positions. An optical filter film may be formed on at least one optical surface of, for example, the birefringent crystal plates or the Faraday elements.

The above-mentioned technique for reducing wavelength-dependent losses is applicable to reducing temperature-dependent losses. The temperature dependence of the optical attenuator can be lessened by providing the optical attenuator with an optical filter having a temperature-dependent characteristic reverse to those of the component optical parts of the optical attenuator. The temperature dependence of the optical attenuator can be lessened by providing an optical filter having characteristics that are reversed to the temperature-dependent losses caused by the optical structural parts of the optical attenuator.

Industrial Applicability

According to the embodiments of the present invention described above, a high-attenuation shutter function can be achieved by configuring the attenuator such that both the forward-path light beam and the return-path light beam pass through the main attenuator unit. Further, according to the embodiments of the present invention, the attenuator can be made smaller compared to a conventional two-stage cascade connection type attenuator, and power saving and reduction in the number of components can be achieved while providing a high-attenuation shutter function. Further, according to the embodiments of the present invention, it is possible to halve the space necessary for mounting input and output fibers, the attenuator can also be installed in corners, and it is possible to achieve an effect that the degree of freedom of selecting a position for installation is increased while providing a high-attenuation shutter function.

The invention claimed is:

1. A reflection-type variable optical attenuator comprising:
    a main attenuator unit including a first birefringent crystal plate, a Faraday rotational angle varying unit, and a second birefringent crystal plate arranged in this order, said Faraday rotational angle varying unit including a Faraday element, a permanent magnet that magnetically saturates said Faraday element, and an electromagnet that applies a variable magnetic field to said Faraday element;
    an input port and an output port that are arranged on a side of one end of said main attenuator unit; and
    a two-point reflection-type optical path varying reflector that is arranged on a side of the other end of said main attenuator unit;
    wherein said Faraday element has a structure in which a compensating film Faraday element that has a high coercive force and in which a Faraday rotational angle scarcely changes with respect to a magnetic field caused by said electromagnet is arranged between basic film Faraday elements that have been divided into two and in which Faraday rotational angles change according to the magnetic field applied by said electromagnet, and the direction of Faraday rotation of said basic film Faraday elements and the direction of Faraday rotation of said compensating film Faraday element are opposite to each other; and
    wherein light that comes in from said input port makes a round trip in said main attenuator unit and goes out through said output port.

2. A reflection-type variable optical attenuator according to claim 1, wherein
    a quarter-wavelength plate is arranged between said main attenuator unit and said optical path varying reflector such that a light beam for a forward path and a light beam for a return path both pass through said quarter-wavelength plate.

3. A reflection-type variable optical attenuator according to claim 1, wherein
    a half-wavelength plate is arranged between said main attenuator unit and said optical path varying reflector such that either one of a light beam for a forward path or a light beam for a return path passes through said half-wavelength plate.

4. A reflection-type variable optical attenuator according to claim 1, wherein
    said two-point reflection-type optical path varying reflector has a right-angle prism or a corner-cube prism.

5. A reflection-type variable optical attenuator according to claim 1, wherein
said two-point reflection-type optical path varying reflector has a structure in which two reflecting mirrors are combined at right angles.

6. A reflection-type variable optical attenuator according to claim 1, wherein:
an input fiber and an output fiber of a two-core ferrule are arranged at the positions of said input port and said output port, respectively; and
a fiber coupling lens that is shared for input and output, and an optical path correcting element that collimates the light emitted from said input fiber into a beam that is parallel to the optical axis and that couples, to said output fiber, a beam that is the return light and that is parallel to the optical axis are arranged between said first birefringent crystal plate and said two-core ferrule.

7. A reflection-type variable optical attenuator according to claim 6, wherein
said two-core ferrule has a structure in which said input fiber and said output fiber are both eccentric with respect to the center axis of said two-core ferrule.

8. A reflection-type variable optical attenuator according to claim 6, wherein
said two-core ferrule has a structure in which either one of said input fiber or said output fiber is positioned on the center axis of said two-core ferrule, and the other one is eccentric with respect to said center axis.

9. A reflection-type variable optical attenuator according to claim 1, wherein:
said Faraday element has a combination of
a basic film Faraday element in which a Faraday rotational angle changes according to a magnetic field applied by said electromagnet, and
a compensating film Faraday element that has a high coercive force and in which a Faraday rotational angle scarcely changes with respect to the magnetic field applied by said electromagnet; and
the direction of Faraday rotation of said basic film Faraday element and the direction of Faraday rotation of said compensating film-Faraday element are opposite to each other.

10. A reflection-type variable optical attenuator according to claim 1, wherein:
said electromagnet includes a C-shaped magnetic yoke and a coil wound around said yoke; and
said electromagnet is placed in a plane that is parallel to the optical axis such that said C-shaped magnetic yoke surrounds said optical path varying reflector.

11. A reflection-type variable optical attenuator according to claim 1, wherein
said first birefringent crystal plate and said second birefringent crystal plate have a wedge shape, and an angle between the optic axes of the plates is 90.

12. A reflection-type variable optical attenuator according to claim 1, wherein
said first birefringent crystal plate and said second birefringent crystal plate are parallel flat plates, and angles of the optic axes of the plates are made to be parallel to each other.

13. A reflection-type variable optical attenuator according to claim 1, wherein
wavelength-dependent and/or temperature-dependent losses in said main attenuator unit are reduced by inserting in at least one position between optical parts of said attenuator, an optical filter in which an optical filter film is formed on a transparent substrate.

14. A reflection-type variable optical attenuator according to claim 1, wherein
wavelength-dependent and/or temperature-dependent losses in said main attenuator unit are reduced by imparting an optical filter function on at least one optical surface of an optical part of said attenuator.

* * * * *